United States Patent Office 3,634,217
Patented Jan. 11, 1972

3,634,217

ELECTROCHEMICAL STRIPPING PROCESS

Ram Dev Bedi, Southfield, and Fred Aoun, Madison Heights, Mich., assignors to M & T Chemicals Inc., New York, N.Y.

No Drawing. Filed Aug. 20, 1968, Ser. No. 753,891
Int. Cl. B01k *1/00*
U.S. Cl. 204—146 5 Claims

ABSTRACT OF THE DISCLOSURE

In accordance with certain of its aspects, this invention relates to novel compositions and to a process for removing predetermined amounts of metal from a metal surface which comprises contacting said metal surface with an aqueous alkaline bath containing an amount of chelating agent sufficient to decrease the time required to remove a fixed amount of surface metal per unit of time using an identical aqueous alkaline bath essentially free of said chelating agent.

This invention relates to novel stripping compositions and processes. More particularly, this invention relates to improved compositions which may be employed to strip metal surfaces such as electroplated surfaces in a controlled, continuous method.

In accordance with certain of its aspects, this invention relates to novel compositions and to a process for removing predetermined amounts of metal from a metal surface which comprises contacting said metal surface with an aqueous alkaline bath containing an amount of chelating agent sufficient to decrease the time required to remove a fixed amount of surface metal per unit of time using an identical aqueous alkaline bath essentially free of said chelating agent.

An object of this invention is to provide improved stripping compositions and processes. A further object of the invention is to provide improved chemical compositions for use in the removal of controlled amounts of metal from an article having an exposed metal surface on at least a portion of its total surface area. Other objects will be apparent to those skilled in the art upon inspection of the following detailed disclosure.

The present invention is particularly useful in the electroplating art wherein plated surfaces must be removed in order to modify the shape, size, or configuration of an article or to prepare certain portions of the plated article prior to application of a plate of a different metal. Since plating a metallic article invariably causes a change in the dimensions of the article, it may be necessary to modify the plated article in order to bring certain critical surfaces back to specified dimensions. This may be especially critical in the production of moving parts which have been previously machined to very close tolerances.

In any production operation requiring the removal of portions of metal surfaces from a given article, it is extremely important that the removal of the metal surface be accomplished quickly and in a precisely controlled and reproducible manner so that the final articles produced are of uniform shape and size. When the metal is to be removed electrolytically, the use of excessive current in order to increase the rate of metal removal may result in excessive etching and produce a final product of uneven, non-uniform dimensions.

It has now been found that improved metal stripping efficiency may be obtained from aqueous alkaline metal stripping compositions by incorporating into said compositions an effective amount of a heavy-metal chelating agent.

In accordance with certain of its aspects, this invention relates to novel compositions and to a controlled method of removing at least a portion of the metal surface of an article by placing said metal surface in contact with an aqueous alkaline composition reactive with said metal surface, said composition containing at least one organic chelating agent in an amount sufficient to decrease the time required to remove a fixed amount of surface metal from said article per unit of time using controlled electrical current wherein said article is electrically connected as electrode and said composition is electrically connected as conductor during removal of a predetermined portion of said metal surface.

Suitable chelating compounds which may be used according to the novel invention include compounds which form a cyclic structure characterized by a ring containing said compound or a radical thereof and a heavy metal ion or radical wherein said ring is completed by coordination with an unshared pair of electrons. Heavy metals as used herein includes those metals which have a density of at least 3.0 grams per cc. under standard conditions. Typically, at least about 0.5 gram per liter of chelating compound (including combinations of different chelating compounds) may be used to improve the stripping efficiency of the alkaline bath composition. Preferably, about 2–15 grams per liter of chelating compound may be employed.

Chelating agents which may be employed are those wherein the logarithm of the equilibrium formation constants (i.e. log K, for a 1–1 mole mixture of metal ion and chelating agent, as defined in Chemistry of the Metal Chelate Compounds, Martell and Calvin, p. 559, pub. 1952, Prentice-Hall, Inc.) may vary between about 1.0 and 16.0. Such chelating agents which form chelate complexes with heavy metal ions and which increase the oxygen overvoltage of the surface to be removed may be combined with the alkaline media in concentrations of at least 0.5 gram per liter of alkaline metal stripping composition. Typical concentrations of chelating agents in alkaline media include concentrations of 1.0–25.0 grams per liter, and, preferably, 5–10 grams of chelating agent per liter of combined alkaline metal stripping solution and chelating agent. The concentration of the alkaline material may be from 0.1–2.0 moles per liter based upon the total volume of the aqueous metal stripping composition including chelating agents. Preferred concentrations of alkaline media may be 0.1–2.0 moles per liter of total alkaline material and preferably 0.3–1.0 mole per liter. The weight ratio of alkaline material to chelating agent (on a dry basis) may vary from about 100:1 to about 10:1 and preferably from about 25:1 to 50:1.

Suitable chelating agents (including salts thereof) which may be used according to the invention may include nitrogen-containing compounds such as nitrilotriacetic acid (NTA); trisodium nitrilotriacetic acid; dinitrilotriacetic acid (DNTA); etc. Other suitable chelating materials may include ethylenediamine;
propylenediamine;
2,2-dimethyl-1,3-diaminopropane;
2-hydroxy-1,3-diaminopropane;
bis-1,2-diaminocyclohexane;
histamine;
2-aminomethylpyridine;
N-hydroxyethyl-2-aminomethylpyridine;
pyridoxamine;
1,2,3-triaminopropane;
diethylenetriamine;
N-aminoethyl-2-(2-aminoethyl)-pyridine;
triethylenetetramine;
ethylene bis-2,2-(2-aminomethyl)-pyridine;
$\beta,\beta',\beta''$-triaminotriethylamine;
N,N'-diglycylethylenediamine;

tetrakis(2-aminoethyl)-ethylenediamine;
2-mercaptoethylamine;
bis-(2-aminoethyl)-sulfide;
glycine;
N,N-dihydroxyethylglycine;
α-alanine;
valine;
norvaline;
levcine;
norleucine;
α,β-diaminopropionic acid;
1-ornithine;
d,1-ornithine;
asparagine;
lysine;
arginine;
proline;
tryptophan;
cysteine;
methionine;
histidine;
aspartic acid;
glutamic acid;
glycylglycine;
glutathione;
iminodiacetic acid;
N-methyliminodiacetic acid;
anilinediacetic acid;
N-acetamidoiminodiacetic acid;
β-(N-trimethylammonium)-ethyliminodiacetic acid;
N-cyanomethyliminodiacetic acid;
N-methylethyliminodiacetic acid;
aminobarbituric acid;
N,N-diacetic acid;
N-hydroxyethyliminodiacetic acid;
N-3-hydroxypropyliminodiacetic acid;
N-carbethoxy-β-aminoethyliminodiacetic acid;
β-mercaptoethyliminodiacetic acid;
N-methylthioethyliminodiacetic acid;
iminopropionicacetic acid;
iminodipropionic acid;
N-2-hydroxyethyliminodipropionic acid;
nitrilotriacetic acid;
nitrilopropioniodiacetic acid;
nitrilodipropionicacetic acid;
nitrilotripropionic acid;
ethylenediamine-N,N′-diacetic acid;
N,N-ethylene bis-[-2-(o-hydroxyphenyl)] glycine;
ethylene bis-N,N-(2-aminomethyl)-pyridine-N,N′-diacetic acid;
ethylenediamine-N,N′-dipropionic acid;
N-hydroxyethylenediaminetriacetic acid;
ethylenediaminetetra-acetic acid (EDTA);
1,2-diaminocyclohexane-N,N′-tetra-acetic acid;
ethylenediamine-N,N′-dipropionic-N,N′-diacetic acid;
ethylenediamine-N,N′-tetrapropionic acid;
2-aminomethylpyridine-N-monoacetic acid;
diethylenetriaminepenta-acetic acid (DTPA);
etc.

The addition of such chelating agents to an alkaline metal stripping composition has been found to provide improved stripping rates, especially when electric current is passed through the stripping solution using as one electrode the metal surface of the article from which a portion of the metal is to be removed. Typical improved metal stripping times (measured as the amount of time required to strip one gram of metal from a surface area immersed in said alkaline cleaning bath) may amount to a reduction in time of 20% or more. Furthermore, improved results in control of the stripping rate is obtained by the use of the novel stripping compositions of the invention.

Suitable alkaline stripping baths which may be employed according to the process of the invention include aqueous sodium hydroxide, aqueous potassium hydroxide, aqueous potassium pyrophosphate, and aqueous sodium pyrophosphate. Other examples of alkaline plating compositions within the scope of the invention include the following compositions which are summarized in Table I. The electric current ranges shown in Table I are expressed in amperes per square decimeter (a.s.d.). Unless otherwise designated, each stripping composition contains the specified ingredients in an aqueous system.

TABLE I

| Stripping Composition Number | Ingredients | Amounts, g./l. | Type of metals removed | Electric current ranges, a.s.d. | Average stripping times, [1] minutes |
|---|---|---|---|---|---|
| 1 | Potassium pyrophosphate ($K_2P_2O_7$)<br>Chelating agent [NTA, EDTA, DTPA, etc.] | 100-300<br>1-25 | Cr, Cu, Zn, Sn, Pb | 0.5-75 | 25.9 |
| 2 | Sodium hydroxide (NaOH)<br>Chelating agent [NTA, EDTA, DTPA, etc.] | 10-10<br>1-25 | do | 0.5-75 | 26.8 |
| 3 | Potassium hydroxide (KOH)<br>Chelating agent [NTA, EDTA, DTPA, etc.] | 8-75<br>1-25 | do | 0.5-75 | 25.2 |
| 4 | Sodium pyrophosphate ($Na_2P_2O_7$)<br>Chelating agent [NTA, EDTA, DTPA, etc.] | 100-350<br>1-25 | do | 0.5-75 | 23.9 |
| 5 | Potassium pyrophosphate ($K_2P_2O_7$)<br>Potassium hydroxide (KOH)<br>Chelating agent [NTA, EDTA, DTPA, etc.] | 100-200<br>100-200<br>1-25 | do | 0.5-75 | 24.8 |

[1] Time required to remove one gram of metal surface.

Typical metals which may be removed according to the process and compositions of this invention include chromium (Cr); copper (Cu); zinc (Zn); tin (Sn); and lead (Pb). Any metal which may be removed by reaction in alkaline media, either with or without current flowing through said media, may be stripped in a regulated bath according to the invention. In particular, chromium plated steel articles (e.g. valve stems) wherein precision tolerances may be demanded may be efficiently stripped in a continuous cycle under electrolytic conditions using the process and compositions of the present invention.

Although metal stripping compositions may be employed without the use of electric current for some applications, it is preferred in most commercial metal stripping operations employing the invention to electrolytically strip the surface metal from the article in order to save time and production costs.

In a preferred embodiment of this invention, chromium plated articles (such as precision parts composed of a steel substrate and one or more different deposits of metals over said steel substrate wherein the final surface layer may be a layer of chromium, usually electrodeposited chromium) may be immersed in an alkaline stripping solution typically containing from 100 to 300 grams per liter of potassium pyrophosphate and from about 0.5 to 300 grams per liter of potassium pyrophosphate and from bout 0.5 to 300 gram sper liter of a chelating agent such as ethylenediamine tetraacetic acid, diethylenetriaminepentaacetic acid, or other chelating agents having a log K value of between 1.0 and about 16.0, as previously defined. The temperature of the aqueous alkaline chelate-containing metal stripping bath composition may be maintained at a temperature of about 5° C.–80° C. and preferably at a temperature of about 20° C.–60° C.

The chromium plated steel articles to be stripped may be placed as electrode in intimate electrical contact with a suitable power source. Another electrode (which may be a container) is connected with the chromium plated steel articles and said alkaline aqueous chelate-containing stripping bath composition, so that the stripping bath acts as a conductor during the metal stripping operation when the electrical current flows to produce controlled dissolution of the metal surface. Current is allowed to flow through the system for a period of time which is sufficient to remove predetermined specified amounts of chromium metal from the chromium plated article. It has been found that the incorporation of a chelating agent into an alkaline metal stripping bath composition results in improved performance in said metal stripping operation. The removal of a given amount of metal surface is thereby accomplished in less time than would otherwise be required.

The following examples are submitted for the purpose of illustration only and are not to be construed as limiting the scope of the invention in any way.

EXAMPLE 1

Separate one liter aqueous stripping baths were prepared by dissolving 250 grams of potassium pyrophosphate in water to form a Control solution. The Control solution contained no chelating agents. Other aqueous baths containing 250 grams per liter of potassium pyrophosphate plus an amount of one or more chelating agents as indicated in Table II were prepared and brought to a final volume of one liter by addition of water.

Steel cylinders (each 3 centimeters long and having a diameter of one centimeter with an essentially uniform chromium electroplate of 25 microns thick over their entire surface) were connected as electrodes to a D.C. power source and completely immersed in each of the solutions described in Table II. A current density of 6–8 amps per square decimeter was employed during the metal stripping operation. Stripping of each of the chromium plated steel cylinders was carried out while the bath composition was maintained at a temperature of approximately 48° C.–50° C. The total stripping time was recorded and the corresponding time required to remove one gram of metal was calculated and recorded in Table II.

As can readily be determined by examination of Table II, the time required to strip one gram of chromium from each of the identical chromium plated mandrels was significantly reduced (i.e. by the factor of about 10–20%) by the addition of the organic chelating agents to the alkaline bath according to the invention.

Although this invention has been illustrated by reference to specific embodiments, modifications thereof which are clearly within the scope of the invention will be apparent to those skilled in the art.

We claim:

1. A process for removing at least a portion of the metal surface of a composite article bearing a metal surface selected from the metals consisting of chromium, copper, zinc, tin, and lead over a substrate by placing said metal surface in contact with an aqueous alkaline composition reactive with said metal surface, and having a concentration of 0.1–2.0 moles per liter, said alkaline composition containing 1.0–25.0 g./l. of at least one chelating agent having Log K of 1–16, maintaining the weight ratio of alkaline material to chelating agent at about 100:1 to 10:1; on a weight basis passing controlled electrical current through said alkaline composition, using at least a portion of the metal surface of said article as electrode for a time period sufficient to remove a predetermined portion of said metal surface forming a stripped article; and removing said stripped article from said alkaline composition.

2. A process as claimed in claim 1 wherein the temperature of the aqueous alkaline composition is maintained at about 5° C.–80° C.

3. A process as claimed in claim 1 wherein the chelating agent is nitrolotriacetic acid.

4. A process as claimed in claim 1 wherein the chelating agent is ethylenediaminetetra-acetic acid.

5. A process as claimed in claim 1 wherein the chelating agent is diethylenetriaminepenta-acetic acid.

TABLE II

EFFECT OF DIFFERENT ADDITIVES IN PYROPHOSPHATE BATH

| Ex. No. | Chelating agent (in 250 g./l. aqueous potassium pyrophosphate bath | Formula of additive | Concentration (equivalent amount based on the M.W.) (g./l.) | Time in minutes required for stripping 1 g. of Cr (average of 5 tests) |
|---|---|---|---|---|
| 1 | None (Control) | | | 26.2 |
| | Nitrilotriacetic acid (NTA) | $(CH_2—COOH)_3N$ | 5.00 | 22.8 |
| 2 | None (Control) | | | 26.9 |
| | Trisodium nitrilotriacetate | $(CH_2—COONa)_3N·H_2O$ | 7.21 | 23.7 |
| 3 | None (Control) | | | 22.9 |
| | Ethylenediaminetetraacetic acid (tetrasodium salt) | $(NaOCOCH_2)_2—NCH_2CH_2N(CH_2COONa)_2$ | 9.96 | 20.9 |
| 4 | None (Control) | | | 27.5 |
| | Diethylenetriaminepenta-acetic acid (DTPA) | 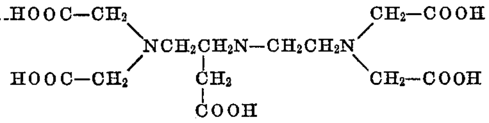 | 10.31 | 26.2 |

References Cited

UNITED STATES PATENTS 2,241,585 5/1941 Day ---------------- 204—146

3,314,890 4/1967 Smith -------------- 252—79.3

OTHER REFERENCES

The Versenes, Technical Bulletin No. 2, Bersworth Chemical Co., Framingham Mass., January 1951, Sec. I, pp. 4, 5, 7 and 8.

Chemical Cleaning and Etching, Surface Treatment and Finishing of Al and Its Alloys, Wernick and Pinner, Draper Ltd., p. 188, Teddington 1964.

JACOB H. STEINBERG, Primary Examiner

U.S. Cl. X.R.

156—3; 252—193